June 21, 1955 R. TEMPLE 2,711,331
SELF-TIGHTENING CONDUIT COUPLINGS
Filed July 8, 1949
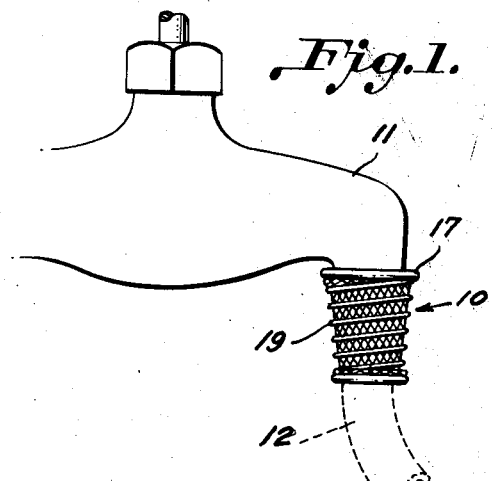
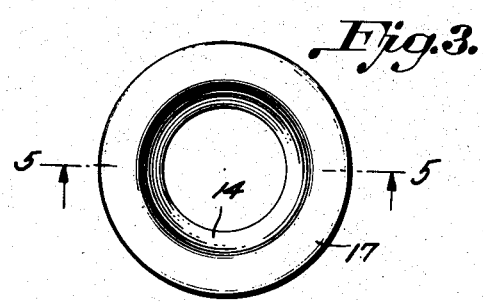
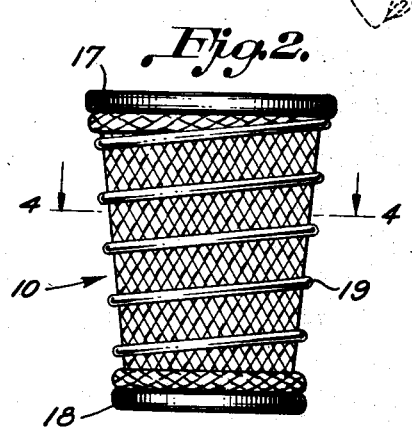
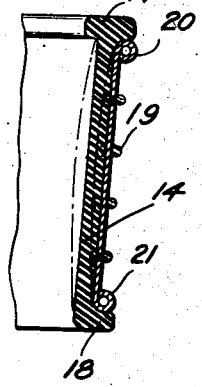
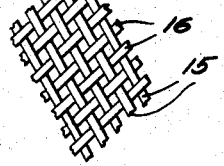
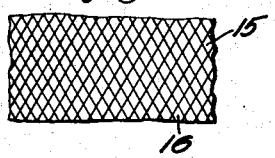
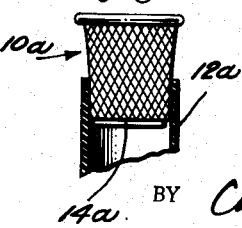
INVENTOR
Robert Temple
BY Charles L. Sturtevant
ATTORNEY

United States Patent Office 2,711,331
Patented June 21, 1955

2,711,331

SELF-TIGHTENING CONDUIT COUPLINGS

Robert Temple, Chevy Chase, Md.

Application July 8, 1949, Serial No. 103,583

4 Claims. (Cl. 285—90)

The present invention relates to new and useful improvements in connectors and more particularly to improvements in quick attachable and detachable connectors adapted for connecting fluid conduits, such as hose or the like.

In general, the invention contemplates the provision of a coupling assembly which may be used for quickly attaching and detaching conduit lengths or for attaching conduits to fixed fluid outlets such as faucets or the like. More particularly, the invention is concerned with a coupling assembly for securing conduits without a threaded or other conventional mechanical connection.

One of the principal objects of the present invention is to provide a conduit coupling which is effective to firmly grip and seal the joint upon passage therethrough of fluid under pressure.

Another object of the invention is to provide a conduit coupling which is peripherally contractible into tight engagement with the conduit members upon slight axial extension thereof.

A further object of the invention is to provide a conduit coupling having a sleeve-like gasket for sealing the space between the conduit members and the coupling, this sealing gasket being peripherally contracted against the conduit members by axial extension of a sleeve-like gripping device.

A still further object of the invention is to provide a coupling assembly operable substantially as indicated above and integrally connected as a part of a conduit, such as a hose or the like.

A still further object of the invention is to provide a conduit coupling wherein spring means may be employed for actuating the gripping device at least for the purpose of holding the conduit members together before passage of fluid therethrough.

The invention still further aims to provide a conduit coupling substantially of the above type which consists of a minimum number of parts, which may be readily assembled, and which is inexpensive to manufacture and efficient in use, and which can be conveniently formed as a part of one of the conduits, such as above.

The above and further objects of the invention will in part be obvious and will be hereinafter more fully pointed out.

In the accompanying drawings—

Figure 1 is a side elevation showing the coupling assembly in position for attaching a hose to a faucet;

Figure 2 is an enlarged side elevation of the coupling assembly;

Figure 3 is a top plan view of Figure 2;

Figure 4 is a sectional view taken substantially along the line 4—4 of Figure 2;

Figure 5 is a sectional view taken substantially along the line 5—5 of Figure 3;

Figure 6 is a fragmentary sectional view similar to Figure 5 but showing a part of the coupling assembly in longitudinally extended position with the intermediate part thereof peripherally contracted;

Figure 7 is a fragmentary view of a part of the gripping device with the relatively slidable elements thereof in relaxed and slightly spaced position;

Figure 8 is a view similar to Figure 7 but showing the position of the relatively slidable elements upon axial extension of the gripping device;

Figure 9 is a longitudinal section showing a modification wherein the coupling is integrally joined to one end of a conduit, such as a hose.

Referring more in detail to the accompanying drawings, one application of the invention is shown in Figure 1 wherein the coupling assembly, generally indicated by the numeral 10, is in position connecting a faucet 11 with a hose 12 or the like. The faucet may be of the type for attaching a garden hose or the like or it may be of the type in a sink or bathtub in which case the coupling assembly may be used for attaching a rubber hose for a shower nozzle or dishwasher nozzle or the like.

The coupling assembly includes an inner rubber sleeve 14 which is illustrated as being slightly tapered from the upper end to the bottom end thereof. This sleeve 14, while illustrated as being of rubber, may be of any suitable sealing material which is resilient, compressible and elastically extensible within certain limits.

Exteriorly of the sealing sleeve 14, there is provided a sleeve-like gripping device which consists of a plurality of parallel strands arranged in sets which are disposed diagonally with respect to each other. Thus, the strands 15 of one set are parallel to one another but are disposed diagonally with respect to the strands 16 of the other set. The strands of both sets are interwoven and are preferably of an inert material of such a nature that the strands are relatively slidable with respect to each other. Thus, in an inert or relaxed position, as shown in Figure 7, the strands are slightly spaced from one another but, as shown in Figure 8, the strands are shown in tight engagement with one another when the gripping sleeve is axially extended. As an example of a material which is suitable for the diagonal strands or strips, a copolymer vinyl or nylon plastic is considered to be highly satisfactory, although any suitable material may be employed, such as metal bands.

The ends of the gripping sleeve are secured in any suitable manner, as by cementing, interlocking or the like, to upper and lower outward flanges 17, 18, respectively, on the inner sealing sleeve 14. A coil spring 19 may be employed and is disposed exteriorly of the gripping sleeve, the upper and lower peripheral edges 20, 21, respectively, of which are curled around the adjacent spring coils and suitably secured thereto. The spring 19 may be arranged to extend the gripping sleeve longitudinally and to thus maintain the sleeve in a slightly peripherally contracted position particularly in the central portion thereof. Pressing on the ends of the coupling assembly will compress the spring to relieve the longitudinal stress on the gripping sleeve and thus permit the gripping sleeve to be peripherally expanded. In this position of the assembly, it may be applied to the conduit ends which are to be joined. Release of pressure on the ends of the coupling assembly will then permit the spring 19 to longitudinally extend the gripping sleeve with resultant peripheral contraction thereof to engage the adjacent ends of the conduits to be connected.

The relative diagonal disposition of the interwoven strands 15, 16 is such as to permit the requisite amount of gripping action or contraction as the result of a predetermined longitudinal extension of the sleeve. The size of the particular conduits to be joined will also enter into the proper selection and disposition of the interwoven strands.

In using the coupling assembly shown in Figure 2, it is first axially compressed against the action of the spring 19 to permit the two conduit ends to be inserted therein, as shown in Figure 5. Release of pressure on the ends of the coupling assembly permits the spring 19 to expand and, in doing so, the relatively sliding together between the strands 15, 16 results in peripheral contraction of the gripping sleeve in the central portion thereof. This peripheral contraction will of course similarly contract the sealing sleeve 14 against the adjacent surfaces of the conduits which are thus connected. To more clearly illustrate this action, reference is made to Figure 6, wherein the central portion of the coupling assembly is shown slightly curved inwardly and it is this inward curving resulting from peripheral contraction of the gripping sleeve that causes the tight engagement of the sealing sleeve 14 with the adjacent surfaces of the conduit ends. In Figure 6, the inner dotted position of sleeve 14 and the gripping sleeve is a diagrammatic showing. In reality, the resiliency of the sleeve 14 permits it to be pressed and more or less flattened tightly in engagement with the adjacent surfaces of the connected conduits to provide a leakproof joint as the longitudinal stress on the gripping sleeve effects peripheral contraction thereof. When water or other fluid is turned on to pass through the connected ends of the two conduits, the force of the fluid passing therethrough, that is, downwardly in the assembly shown in Figure 1, will result in a drag on the hose 12 and this drag in turn will be transmitted to the sealing sleeve 14 which, because of its connection at the bottom of the gripping sleeve, will result in longitudinal extension of this gripping sleeve. This longitudinal extension will effect the relative sliding between the strands 15, 16 to the substantially closed position thereof, as shown in Figure 8, and, in this position of the strands, the central portion of the gripping sleeve will be peripherally contracted, thus forcing the sealing sleeve 14 into even tighter engagement with the adjacent ends of the conduits. Thus, the force of the fluid passing through the connected conduits will augment the action of the spring 19 and effect increased sealing between the sleeve 14 and the conduits so as to prevent any leakage in the coupling assembly.

In Figure 9, the coupling assembly is illustrated as being directly connected to one end of a hose 12a or the like, in any suitable manner. Thus, the gripping sleeve is formed, as previously indicated, of interwoven diagonal strands 15, 16a and the lower end of this sleeve is suitably bonded to the inner surface of the hose although it may be embedded in the end of the hose if desired. The gripping sleeve is substantially self-sustaining, the material of the strands being selected for this purpose, and has secured at the outer end thereof a sealing sleeve in the form of a tubular skirt 14a which extends into the hose and forms a fluid-tight seal with the faucet or other supply conduit to which the hose is to be connected.

In using this form of the invention, the spring may be omitted, as it may in the previously described form, and the coupling which is attached to the end of the hose 12a is forced over the outlet end of a faucet and the weight or downward pull of the hose will cause sufficient longitudinal stress in the coupling to effect peripheral contraction thereof into engagement with the faucet. When the water is turned on, the force thereof passing through the hose will effect increased longitudinal stress in the coupling with resultant increased peripheral contraction thereof, thus affording a tight seal between the sealing sleeve 14a and the adjacent surface of the faucet. Release of the hose can be effected by slightly compressing the coupling longitudinally so that it is peripherally expanded sufficiently to be removed from the faucet.

From the foregoing description, it will be appreciated that the present invention provides a highly efficient coupling which may be a separate unit adapted to connect two conduits or which may be formed as a permanent attachment at an end of a conduit, such as a hose. The coupling may be quickly attached and detached by simple manipulation thereof longitudinally, as described, in order to effect the desired peripheral expansion or contraction thereof.

While certain forms of the invention have been shown for purposes of illustration, it is to be clearly understood that various changes in the details of construction and arrangement of parts may be made without departing from the scope of the invention as set forth in the appended claims.

I claim:
1. A unitary coupling assembly for connecting fluid conduits and comprising a sealing sleeve of sufficient resiliency to be elongated and compressed into gripping engagement with the conduits to prevent leakage of fluid therebetween, and a gripping sleeve surrounding the sealing sleeve and having the ends thereof positioned between the ends of the sealing sleeve and with each end thereof fixed to the adjacent end of said sealing sleeve and including relatively movable interwoven and spaced diagonally arranged strand elements peripherally contractible on said sealing sleeve upon longitudinal extension thereof to effect compressed binding and sealing engagement between the sealing sleeve and the conduits.

2. A unitary coupling assembly as claimed in claim 1, wherein a coil spring encircles the gripping sleeve and is fixed to the ends thereof to normally stretch the gripping sleeve to effect sealing engagement between the sealing sleeve and the conduits.

3. A unitary coupling assembly as claimed in claim 2, wherein the opposite ends of the sealing sleeve are provided with radial flanges against which the adjacent ends of the spring bear.

4. In combination with a fluid conduit adapted for connection with another conduit, a unitary coupling assembly comprising a sealing sleeve of sufficient resiliency to be elongated and compressed into gripping engagement with the said other conduit to prevent leakage of fluid, and a gripping sleeve surrounding the sealing sleeve and having the ends thereof positioned between the ends of the sealing sleeve with one end of said gripping sleeve fixed to the adjacent end of the sealing sleeve and with the other end of the gripping sleeve fixed to the fluid conduit, said gripping sleeve including relatively movable interwoven and spaced diagonally arranged strand elements peripherally contractible on the sealing sleeve under the influence of fluid under pressure passing through the conduits when connected and tending to separate the conduits and thus effect a tighter seal between the connected conduits and the sealing sleeve of the coupling assembly.

References Cited in the file of this patent

UNITED STATES PATENTS

| 475,213 | Fraser | May 17, 1892 |
| 656,187 | Gunnell | Aug. 21, 1900 |
| 839,260 | Benson | Dec. 25, 1906 |
| 927,635 | Calvert | July 13, 1909 |
| 1,004,678 | Nicholls | Oct. 3, 1911 |
| 2,185,741 | Sorg et al. | Jan. 2, 1940 |
| 2,383,733 | Parker | Aug. 28, 1945 |
| 2,434,358 | Frank | Jan. 13, 1948 |

FOREIGN PATENTS

| 542,135 | England | Dec. 29, 1941 |
| 563,937 | England | Sept. 6, 1944 |
| 602,547 | Germany | May 29, 1935 |